(12) United States Patent
Cunningham (10) Patent No.: US 11,208,575 B2
(45) Date of Patent: Dec. 28, 2021

(54) ASSEMBLY PROCESSES USING UV CURABLE PRESSURE SENSITIVE ADHESIVES (PSA) OR STAGEABLE PSA SYSTEMS

(71) Applicant: ILLINOIS TOOL WORKS INC., Glenview, IL (US)

(72) Inventor: Wells Cunningham, New Hartford, CT (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 35 days.

(21) Appl. No.: 15/518,342

(22) PCT Filed: Oct. 24, 2015

(86) PCT No.: PCT/US2015/057261
§ 371 (c)(1),
(2) Date: Apr. 11, 2017

(87) PCT Pub. No.: WO2016/069416
PCT Pub. Date: May 6, 2016

(65) Prior Publication Data
US 2017/0247575 A1    Aug. 31, 2017

Related U.S. Application Data

(60) Provisional application No. 62/122,692, filed on Oct. 27, 2014.

(51) Int. Cl.
*C09J 4/06* (2006.01)
*C09J 5/00* (2006.01)
(Continued)

(52) U.S. Cl.
CPC .............. *C09J 4/06* (2013.01); *B32B 37/12* (2013.01); *C08G 18/8175* (2013.01); *C09J 5/00* (2013.01);
(Continued)

(58) Field of Classification Search
CPC .................... C09J 4/06; B32B 37/12
See application file for complete search history.

(56) References Cited

U.S. PATENT DOCUMENTS 5,976,297 A   11/1999  Oka et al.
6,204,896 B1   3/2001  Matsuhira et al.
(Continued)

FOREIGN PATENT DOCUMENTS

CN      1284197 A      2/2001
WO   2010027011 A1    3/2010
(Continued)

OTHER PUBLICATIONS

Rhesca Co., Ltd., "TAC1000 Pressure-Sensitive Tack of Adhesive Test", See "Measurement of properties of adhesive substances: Methods for measuring tack properties from methods for evaluating physical properties of adhesive substances" in http://www.rhesca.co.jp/language/english/pdf/TAC.pdf; Copyright Rhesca Co., Ltd. (2017); Retrieved from the Internet on Sep. 12, 2017.
(Continued)

*Primary Examiner* — Daniel McNally
(74) *Attorney, Agent, or Firm* — Blue Filament Law PLLC (57) ABSTRACT

A process for creating an assembly with a pressure sensitive adhesive includes the application of a light curable composition to a first substrate of the assembly. The light curable composition is cured with a single light exposure step to form a fully polymerized pressure sensitive adhesive. The resulting pressure sensitive adhesive is brought into contact
(Continued)

with to a second substrate with sufficient force to bond the second substrate to the first substrate to complete the assembly with the pressure sensitive adhesive.

9 Claims, 6 Drawing Sheets

(51) Int. Cl.
*C08G 18/81* (2006.01)
*C09J 175/16* (2006.01)
*B32B 37/12* (2006.01)
*C09J 9/00* (2006.01)
*C09J 11/06* (2006.01)
*C09J 4/00* (2006.01)

(52) U.S. Cl.
CPC ............... *C09J 9/00* (2013.01); *C09J 11/06* (2013.01); *C09J 175/16* (2013.01); *B32B 2457/00* (2013.01); *C08G 2170/40* (2013.01); *C09J 4/00* (2013.01); *C09J 2203/318* (2013.01); *C09J 2301/416* (2020.08); *C09J 2433/00* (2013.01)

(56) References Cited

U.S. PATENT DOCUMENTS

| | | |
|---|---|---|
| 6,218,446 B1 | 4/2001 | Arnold et al. |
| 6,355,750 B1 * | 3/2002 | Herr ............... H01L 24/83 526/262 |
| 6,383,558 B1 | 5/2002 | Fujiwara et al. |
| 6,461,709 B1 | 10/2002 | Janssen et al. |
| 6,654,083 B1 | 11/2003 | Toda et al. |
| 6,673,850 B1 | 1/2004 | Yamato et al. |
| 7,198,831 B2 | 4/2007 | Watanabe et al. |
| 7,910,033 B2 | 3/2011 | Kamata et al. |
| 7,927,533 B2 | 4/2011 | Kamiya et al. |
| 8,821,966 B2 | 9/2014 | Toyoda et al. |
| 2001/0039326 A1 | 11/2001 | Misumi et al. |
| 2002/0018163 A1 | 2/2002 | Yamamoto et al. |
| 2002/0118323 A1 | 8/2002 | Itou et al. |
| 2002/0131141 A1 | 9/2002 | Saitoh |
| 2003/0006704 A1 | 1/2003 | Morimoto et al. |
| 2003/0087054 A1 | 5/2003 | Janssen et al. |
| 2004/0000370 A1 * | 1/2004 | Kiuchi ............... C09J 7/38 156/77 |
| 2005/0126697 A1 | 6/2005 | Kuczynski |
| 2005/0172891 A1 | 8/2005 | Suzuki et al. |
| 2005/0190335 A1 | 9/2005 | Maruyama et al. |
| 2005/0249683 A1 | 11/2005 | L'Alloret |
| 2006/0108050 A1 | 5/2006 | Satake et al. |
| 2006/0128856 A1 | 6/2006 | Takahashi et al. |
| 2006/0159867 A1 | 7/2006 | O'Donnell |
| 2006/0222809 A1 | 10/2006 | Yamada et al. |
| 2006/0235101 A1 | 10/2006 | Messe |
| 2006/0272771 A1 | 12/2006 | Suzuki et al. |
| 2007/0046874 A1 | 3/2007 | Adachi et al. |
| 2007/0051287 A1 | 3/2007 | Stanford |
| 2007/0133225 A1 | 6/2007 | Sakai |
| 2009/0128767 A1 | 5/2009 | Suezaki et al. |
| 2009/0162645 A1 | 6/2009 | Matsuhira |
| 2009/0283211 A1 | 11/2009 | Matsuhira |
| 2009/0296033 A1 | 12/2009 | Shinya et al. |
| 2009/0305068 A1 | 12/2009 | Morishita et al. |
| 2010/0003425 A1 | 1/2010 | Kamata et al. |
| 2010/0021668 A1 * | 1/2010 | Shimokawa ........... C09J 5/06 428/40.2 |
| 2010/0097552 A1 | 4/2010 | Shinya et al. |
| 2010/0097746 A1 | 4/2010 | Toyoda et al. |
| 2011/0008552 A1 * | 1/2011 | Umemoto ........... C09J 133/02 428/1.5 |
| 2012/0121900 A1 * | 5/2012 | Niwa .................. C09J 7/385 428/355 AC |
| 2013/0034713 A1 | 2/2013 | Busman et al. |
| 2013/0139962 A1 * | 6/2013 | Hill ................... G02B 27/62 156/275.5 |
| 2013/0220511 A1 | 8/2013 | Suzuki et al. |
| 2014/0065744 A1 * | 3/2014 | Hayashi ............. H05B 33/10 438/29 |
| 2014/0069581 A1 | 3/2014 | Ogawa et al. |
| 2014/0110056 A1 | 4/2014 | Suwa et al. |
| 2014/0209237 A1 * | 7/2014 | Ogawa ............... G02F 1/1333 156/273.5 |
| 2014/0308465 A1 * | 10/2014 | Krogdahl ............ H05K 3/386 428/34.1 |
| 2016/0091791 A1 | 3/2016 | Iwata et al. |

FOREIGN PATENT DOCUMENTS

| | | |
|---|---|---|
| WO | 2010027041 A1 | 3/2010 |
| WO | 2012024217 A1 | 2/2012 |
| WO | WO2012024217 A1 | 2/2012 |
| WO | 2013173977 A1 | 11/2013 |
| WO | WO2013173977 A1 | 11/2013 |
| WO | WO2014065744 A1 | 5/2014 |

OTHER PUBLICATIONS

International Search Report dated Feb. 3, 2016 for International Application No. PCT/US2015/057261 filed Oct. 24, 2015.

* cited by examiner

Sony (Dexerial Approach) US App 2014/0069581

PRIOR ART

COVER GLASS

FLIP AND ASSEMBLE TO COMPLETE DISPLAY

ASSEMBLY PROCESSES USING UV CURABLE PRESSURE SENSITIVE ADHESIVES (PSA) OR STAGEABLE PSA SYSTEMS

RELATED APPLICATIONS

This application claims priority benefit of U.S. Provisional Application Ser. No. 62/122,692 filed 27 Oct. 2014; the contents of which are hereby incorporated by reference.

FIELD OF THE INVENTION

The present invention in general relates to a pressure sensitive adhesive (PSA) composition and process of usage thereof and in particular to such a composition that is optically clear and light curable with a single light exposure on a single substrate prior to joinder; the resulting bond is amenable to being reworked, thereby finding particular utility electronics.

BACKGROUND OF THE INVENTION

Liquid Optically Clear Adhesives (LOCAs) are used to assemble many structures where the light path passes through the cured adhesive. The standard process for bonding substrates of an electronic device display is to first dispense the uncured liquid adhesive on the surface of a nearly complete display. The cover glass is then carefully laid onto the liquid so as to not trap any bubbles. Then the assembly is exposed to UV and/or visible light to polymerize or "cure" the adhesive bond forming the final display.

These cured adhesive materials are of very low modulus generally of modulus from 0.01-10.0 MPa so as to absorb physical and thermal shock during use of the electronic device such as a smartphone, a computer, a television, or the like. Also, an attribute of a conventional LOCA is that the low modulus allows re-work of the display after cure in case there have been air bubbles trapped there between or other defects in need of correction. This re-work is usually done by dragging a thin wire through the bond line, separating the cover glass from the expensive electronic assembly, cleaning the assembly and repeating the bonding process. This form of re-work is time consuming and prone to damage of both the cover glass substrate and the electronic assembly substrate.

More recent advancements in LOCAs utilize a pre-cure process where the liquid adhesive is exposed to light prior to assembly. This solidifies the adhesive material to an intermediate state of polymerization that allows for easier handling. With these partially cured LOCAs, the adhesive can be applied to the electronic assembly side or to the cover glass, pre-cured and then laminated together. The lamination is often done under vacuum to eliminate air bubble entrapment by techniques similar to the assembly of windshield laminates of glass and plastic "safety films". Subsequent to joinder of the electronic assembly substrate and the cover glass substrate, a second exposure to light is required to achieve the final degree of cure.

Exemplary of a "Pre-cure LOCA" process is that detailed in U.S. Patent Application Publication 2014/0069581 and outlined in PRIOR ART FIGS. 1A-1G and is paraphrased as follows.

Figure 1A:
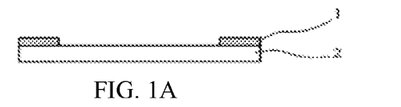
FIGS. 1A-1G are PRIOR ART schematics of steps of manufacturing an image display device as detailed in U.S. Patent Application Publication 2014/0069581.

First, as shown in PRIOR ART FIG. 1A, a light-transmitting cover member 2 is prepared having a light-shielding layer 1 formed on a peripheral part of one surface thereof. Then, as shown in PRIOR ART FIG. 1B, a liquid photo-curable resin composition 3 is applied to a light-shielding layer forming surface 2a of the light-transmitting cover member 2 to a thickness greater than that of the light-shielding layer 1 so as to cancel a step 4 formed between the light-shielding layer 1 and the light-shielding layer forming surface 2a of the light-transmitting cover member 2. More specifically, the photo-curable resin composition 3 is applied, to be flattened, on the entire light-shielding layer forming surface 2a of the light-transmitting cover member 2 including a surface of the light-shielding layer 1 so as to avoid generation of a step. Thus, the photo-curable resin composition 3 is applied to a thickness, preferably from 1.2 to 50 times, and more preferably, from twice to 30 times that of the light-shielding layer 1.

The light-transmitting cover member 2 is required only to have light-transmitting properties that allow an image formed on an image display member to be recognized visually. A plate-like material and a sheet-like material of glass, acrylic resin, polyethylene terephthalate, polyethylene naphthalate, polycarbonate and the like are applicable. These materials can be subjected to a single-sided or double-sided hard coating treatment and an antireflection treatment, for example. The physical properties of the light-transmitting cover member 2 such as a thickness and elasticity can be determined appropriately according to a purpose of use.

The light-shielding layer 1 is provided to enhance an image contrast, for example, and is formed by applying a coating material colored in black and the like by screen printing process, for example, and then drying and curing the coating material. The light-shielding layer 1 generally has a thickness of from 5 to 100 and this thickness corresponds to the step 4.

Figure 1B:
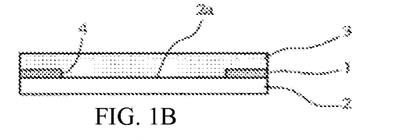

The photo-curable resin composition 3 used in this step is in a liquid state. Using the liquid material can cancel the step 4 firmed between the light-shielding layer 1 and the light-shielding layer forming surface 2a of the light-transmitting cover member 2. The liquid state mentioned herein means one having a viscosity of from 0.01 to 100 Pa·s (25° C.) as measured with a cone-plate rheometer.

Examples of the photo-curable resin composition 3 may include one containing a photoradical polymerizable poly(meth)acrylate such as a polyurethane-based (meth)acrylate and a polyisoprene-based (meth)acrylate, and a photopolymerization initiator as main components. Specific and preferred examples of the photoradical polymerizable poly(meth)acrylate can include (meth)acrylate-based oligomers having a polyisoprene, polyurethane, or polybutadiene skeleton.

Specific and preferred examples of the meth)acrylate-based oligomer having a polyisoprene skeleton can include compounds formed by esterification between a maleic anhydride adduct of polyisoprene polymer and 2-hydroxyethyl methacrylate (UC102 (molecular weight of 17,000 in terms of polystyrene), available from KURARAY CO., LTD.; UC203 (molecular weight of 35,000 in terms of polystyrene), available from KURARAY CO., LTD.; and UC-1 (molecular weight of about 25,000 in terms of polystyrene), available from KURARAY CO., LTD.).

Specific and preferred examples of the (meth)acrylate-based oligomer having a polyurethane skeleton can include aliphatic urethane acrylates (EBECRYL230 (molecular weight of 5000), available from DAICEL-CYTEC Company LTD.; and UA-1, available from Light Chemical Industries Co., Ltd.).

One publicly known is applicable as the eth)acrylate-based oligomer having a polybutadiene skeleton.

A publicly known photoradical polymerization initiator is applicable as the photopolymerization initiator. Examples of the photoradical polymerization initiator can include 1-hydroxy-cyclohexylphenyl ketone (IRGACURE 184, available from Ciba Specialty Chemicals Inc.), 2-hydroxy-1-{4-[4-(2-hydroxy-2-methyl-propionyl)benzyl]-phenyl}-2-methyl-1-propan-1-one (IRGACURE 127, available from Ciba Specialty Chemicals Inc.), benzophenone, and acetophenone.

The aforementioned photopolymerization initiator, if it is too little relative to 100 parts by mass of the photoradical polymerizable poly(meth)acrylate, results in insufficient curing at the time of UV irradiation. If it is too much, output gas is increased due to cleavage to tend to suffer a foaming failure. Thus, the amount of the photopolymerization initiator is preferably from 0.1 to 5 parts by mass, and more preferably from 0.2 to 3 parts by mass.

The liquid photo-curable resin composition 3 can further contain a publicly known plasticizer (flexibility imparting agent) such as terpene-based hydrogenated resins, polybutadiene and polyisoprene having compatibility with the photoradical polymerizable poly(meth)acrylate. These plasticizers are usable as a tackifier as described later. It is appreciated that in several embodiments of the present invention, neither plasticizers nor tackifiers are present, in contrast to the composition detailed with respect to PRIOR ART FIGS. 1A-1G.

The photo-curable resin composition 3 can contain a reactive diluent. Preferred examples of the reactive diluent can include 2-hydroxypropyl methacrylate, benzyl acrylate, and dicyclopentenyloxyethyl methacrylate.

The photo-curable resin composition 3 can further contain, if necessary, a general additive such as an adhesion promoter such as a same coupling agent, and an antioxidant.

The photo-curable resin composition 3 can also contain a chain transfer agent for control of a molecular weight. Examples of the chain transfer agent may include 2-mercaptoethanol, lauryl mercaptan, glycidyl mercaptan, mercaptoacetic acid, 2-ethythexyl thioglycolate, 2,3-dimethylcapto-1-propanol, and α-methylstyrene dimer.

UV irradiation in the step (B) described later may function to reduce the initial adhesive strength (what is called tackiness) and the eventual adhesive strength of the photo-curable resin composition 3. Thus, it is desirable that a material what is called a tackifier be mixed with the photo-curable resin composition 3. Examples of the applicable tackifier used may include terpene-based resins such as terpene resins, terpene phenol resins, and terpene hydrogenated resins; rosin resins such as natural rosin, polymerized rosin, rosin ester, and hydrogenated rosin; and petroleum resins such as polybutadiene and polyisoprene. The amount of such a tackifier to be added is preferably from 40 to 70 parts by mass with respect to 100 parts by mass of the photo-curable resin composition. The curing level of the photo-curable resin composition 3 tends to increase with a greater quantity of a UV ray applied in the step (B). Thus, it is preferred that the tackifier be mixed more within the aforementioned range.

A base material of the photo-curable resin composition 3 is the aforementioned photoradical polymerizable poly (meth)acrylate. Meanwhile, in order for the tackifier to achieve its adhesion imparting effect more strongly, a material formed in advance by polymerizing the photoradical polymerizable poly(meth)acrylate can be contained. Examples of such a polymerized material can include copolymers of butyl acrylate, 2-hexyl acrylate and acrylic acid, and copolymers of cyclohexyl acrylate and methacrylic acid.

The constituting components of the photo-curable resin composition 3 are as described above. Meanwhile, it is preferred that the photo-curable resin composition 3 include the following components determined by reconsidering the entire constitution while giving particular attention to a plasticizer component. This constitution is applied preferably to the case where a light-shielding plate to shield a UV ray or an attenuation plate to attenuate a UV ray is arranged between a UV source and the applied photo-curable resin composition during UV radiation.

The photo-curable resin composition 3 of a preferred constitution suitable for the aforementioned case contains the following components (I) to (IV):

Component (I) an acrylate-based oligomer component selected from the group consisting of a polyisoprene-based (meth)acrylate oligomer, a polybutadiene-based (meth)acrylate oligomer, and a polyurethane-based (meth)acrylate oligomer;

Component (II) an acrylic monomer component;

Component (III) a plasticizer component; and

Component (IV) a photopolymerization initiator component; the total amount of the components (I) and (II) contained in the photo-curable resin composition is from 25 to 80% by mass; the amount of the component (III) contained in the photo-curable resin composition is from 65 to 10% by mass; the component (III) contains a solid tackifier (1) having a softening point of from 60 to 150° C., and a liquid plastic component (2); and the mass ratio between the tackifier (1) and the liquid plastic component (2) falls within a range of 60 to 30:30 to 10. These constituting components are described in detail below.

Component (I)

The photo-curable resin composition of the present invention contains an acrylic oligomer component (component (I)) as a photoradical polymerization component in order for a cured material to maintain its properties as a film. In the present invention, at least one type selected from the group consisting of a polyisoprene-based (meth)acrylate oligomer having a polyisoprene skeleton in a main chain, a polybutadiene-based (meth)acrylate oligomer having a polybutadiene skeleton in a main chain, and a polyurethane-based (meth)acrylate oligomer having a polyurethane skeleton in a main chain, is applicable as the aforementioned acrylic oligomer component.

The polyisoprene-based (meth)acrylate oligomer can be one having a molecular weight of preferably from 1,000 to 100,000 as determined by GPC measurement. Specific and preferred examples thereof can include those already described.

The polyurethane-based (meth)acrylate oligomer can be one having a molecular weight of preferably from 1,000 to 100,000 as determined by GPC measurement. Specific and preferred examples thereof can include those already described.

The polybutadiene-based (meth)acrylate based oligomer can be one having a molecular weight of preferably from 1,000 to 100,000 as determined by GPC measurement. Publicly known oligomers are applicable as the polybutadiene based (meth)acrylate oligomer.

Component (II)

The photo-curable resin composition of the present invention contains a photoradical polymerizable acrylic monomer component (component II) functioning as a reactive diluent. Specific and preferred examples of the acrylic monomer component can include 2-hydroxypropyl(meth)acrylate, benzyl acrylate, and dicyclopentenyloxyethyl(meth)acrylate already described, and additionally, isobornyl(meth)acrylate and octyl(meth)acrylate.

The total amount of the components (I) and (II) added in the photo-curable resin composition, if it is too small, reduces the properties of a cured material as a film, so that it tends to become a cause of slip after adhesion. The total amount, if it is too large, generates excessive curing, so that it tends to become a cause of deformation of a member. Thus, in order to achieve the effect of the present invention, the total amount is from 25 to 85% by mass, and preferably from 30 to 40% by mass. Regarding the mass ratio between the components (I) and (II), an excessively increased relative mass of the component (I) tends to reduce the interfacial strength of the cured material. Conversely, an excessively reduced relative mass of the component (I) tends to be brittle as the properties of the cured material as a film. Thus, in order to achieve the effect of the present invention, the aforementioned mass ratio is preferably from 1:0.5 to 1:3, and more preferably from 1:1 to 1:2.

Component (III)

The photo-curable resin composition of the present invention contains a plasticizer component (component (III)) having compatibility with the acrylic oligomer component being the component (I) and which is also usable as a tackifier. If not having compatibility with the acrylic oligomer component being the component (I), the plasticizer component makes a cured material cloudy to generate the fear of reduction in visibility. Such a plasticizer component contains the solid tackifier (1) and the liquid plastic component (2). The term "solid" mentioned herein means that a softening point is from 60 to 150° C., preferably from 80 to 120° C. according to JIS K5601-2-2. Being liquid means a state exhibiting a viscosity of from 0.01 to 100 Pa·s (25° C.) as measured with a cone-plate rheometer under atmospheric pressure and at 25° C.

The solid tackifier (1) having the aforementioned softening point itself is not photo-cured by UV irradiation. The solid tackifier (1) acts to increase the initial adhesive strength (what is called tackiness) of a cured resin layer or a pre-cured resin layer formed of the photo-curable resin composition, and to increase the eventual adhesive strength of a cured resin layer formed by further curing the pre-cured resin layer completely. Specific examples of the applicable tackifier (1) used can include terpene-based resins such as terpene resins, terpene phenol resins, and terpene hydrogenated resins; rosin resins such as natural rosin, polymerized rosin, rosin ester, and hydrogenated rosin; and petroleum resins such as polybutadiene and polyisoprene. Further, a material prepared in advance by polymerizing the acrylic oligomer component being the component (I) or the acrylate-based monomer component being the component (II) to have a molecular weight of preferably from about 1,000 to about 50,000 can be added within a range not impairing the effect of the present invention. Examples of this polymerized material may include copolymers of butyl acrylate, 2-hexyl acrylate and acrylic acid, and copolymers of cyclohexyl acrylate and methacrylic acid.

The liquid plastic component (2) itself is not photo-cured by UV irradiation. The liquid plastic component (2) imparts flexibility to a cured resin layer or a pre-cured resin layer after photo-curing, and reduces a cure shrinkage between cured resin layers or that of the pre-cured resin layer. The liquid plastic component (2) can be at least one type selected from the group consisting of a liquid polybutadiene-based plasticizer, a polyisoprene-based plasticizer, a phthalate-based plasticizer, and an adipate-based plasticizer.

The mass ratio between the tackifier (1) and the liquid plastic component (2) in the plasticizer component being the component (III) falls within a range of 60 to 30:30 to 10, and preferably, of 60 to 40:20 to 10. In the present invention, if the amount of the solid tackifier (1) is greater than that of the liquid plastic component (2), and particularly if it is within this range, the shape maintaining properties of a cured resin layer after photo-curing and the properties thereof to maintain its adhesive strength can be enhanced.

Generally, a liquid plastic component is contained in a large amount in order to reduce the cure shrinkage of a curable resin composition. In the case of the manufacturing method of the present invention, the curable resin composition is irradiated with a UV ray before it is bonded to an image display member. This advantageously prevents generation of a large cure shrinkage, even if the curable resin composition is photo-cured thereafter. To be specific, this prior art process claims to reduce a cure shrinkage. This can reduce a ratio of the liquid plastic component as compared to a conventional ratio, so that the solid tackifier can be mixed in a larger amount.

The softening point of the tackifier (1) generally has correlation with the molecular weight of the tackifier. Thus, if the tackifier (1) exhibiting a softening point of from 60 to 115° C. among the tackifiers (1) exhibiting a softening point of from 60 to 150° C. is used, the mass ratio between the tackifier (1) and the liquid plastic component (2) is preferably determined to fall within a range of 60 to 40:20 to 10, and more (preferably a range of 60 to 50:20 to 10. If a tackifier exhibiting a softening point of from 115 to 150° C. is used, the mass ratio between the tackifier (1) and the liquid plastic component (2) is preferably determined to fall within a range of 50 to 30:30 to 20, and more preferably 50 to 40:3 to 20.

The amount of the plasticizer component being the component (III) contained in the photo-curable resin composition, if it is too little, leads to poor adhesion to tend to generate a failure such as delamination. If it is too much, the resistance to heat of a cured material degrades, generating the fear of a failure such as melting under heat environment. In order to achieve the effect of the present invention, the amount of the plasticizer component is from 65 to 10% by mass, and preferably from 60 to 30% by mass.

Component (IV)

The photo-curable resin composition of the present invention contains a photopolymerization initiator component (component (IV)) for photoradically polymerizing photopolymerizable components such as the components (I) and (II).

A publicly known photoradical polymerization initiator is applicable as the photopolymerization initiator being the component (IV), and examples thereof can include those already described.

The amount of the photopolymerization initiator being the component (IV) added in the photo-curable resin composition, if it is too little, results in insufficient curing at the time of UV irradiation. If it is too much, output gas is increased due to cleavage to tend to suffer a foaming failure. Thus, the amount of the photopolymerization initiator is preferably from 0.1 to 5 parts by mass, and more preferably from 0.2 to 3 parts by mass relative to 100 parts by mass of a total of the acrylate-based oligomer being the component (I) and the acrylic monomer component being the component (II).

The photo-curable resin composition of the present invention can contain various additives in addition to the aforementioned components (I) to (IV) within a range not impairing the effect of the present invention. As an example, a chain transfer agent similar to that already described can be mixed for control of the molecular weight of the cured resin. Examples of the chain transfer agent can include those already described. Additionally, general additives such as an adhesion promoter such as a silane coupling agent, and an antioxidant can be contained, where appropriate.

The photo-curable resin composition of the constitution determined while giving particular attention to the plasticizer can be prepared by homogeneously mixing the aforementioned components (I) to (IV) and an additive of each type to be added, where appropriate, according to a publicly known mixing technique.

Step (B) (Pre-Curing Step)

Figure 1C:
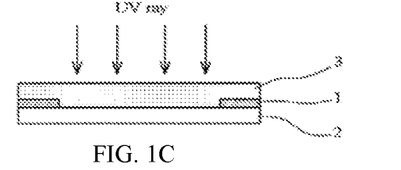
Figure 1D:
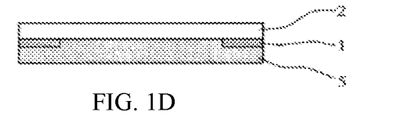

Next, as shown in PRIOR ART FIG. 1C, the photo-curable resin composition 3 applied in the step (A) is irradiated with a UV ray to be pre-cured, thereby forming a pre-cured resin layer 5. Here, the pre-curing is performed to transfer the photo-curable resin composition 3 from a liquid state to a state where it does not flow remarkably. Thus, the photo-curable resin composition 3 does not drop even if it is turned upside down as shown in PRIOR ART FIG. 1D, thereby enhancing handling of the photo-curable resin composition 3. This pre-curing can sufficiently photo-cure a light-transmitting cured resin layer between the light-shielding layer 1 and an image display member without being eliminated from there between. This can also reduce cure shrinkage. This pre-curing is at a level that makes the cure rate (gel fraction) of the pre-cured resin layer 5 preferably from 10 to 80%, and more preferably from 30 to 60%.

The cure rate (gel fraction) mentioned herein is a numerical value defined as a ratio (consumption ratio) of the abundance of a (meth)acryloyl group in the photo-curable resin composition 3 after UV irradiation relative to that of the (meth)acryloyl group before the UV irradiation. Increase of this numerical value shows curing proceeds further.

The cure rate (gel fraction) can be calculated by substituting an absorption peak height (X) at from 1640 to 1620 $cm^{-1}$ above a baseline of an FT-IR measurement chart about a resin composition layer before UV irradiation and an absorption peak height (Y) at from 1640 to 1620 $cm^{-1}$ above a baseline of an FT-IR measurement chart about the resin composition layer after the UV irradiation into the following formula (1)

$$\text{Cure rate } (\%) = \{(X-Y)/X\} \times 100 \quad (1)$$

Regarding UV irradiation, the type of a light source, output, the accumulated amount of light and the like are not specifically limited as long as the pre-curing can proceed such that the cure rate (gel fraction) becomes preferably from 10 to 80%. Publicly known conditions for photoradical polymerization process on (meth)acrylate by UV irradiation are applicable.

Regarding conditions for UV irradiation, it is preferred that conditions be selected within the aforementioned range of the cure rate that do not generate dripping or deformation of the pre-cured resin layer during bonding operation in the step (C) described later. If expressed in terms of a viscosity, such conditions not generating dripping or deformation are preferably 20 Pa·s or more (as measured with a cone-plate rheometer at 25° C., with a cone/plate C35/2 and a number of revolutions of 10 rpm). The viscosity may be less than 20 Pa·s if the pre-cured resin layer 5 is not turned upside down.

Regarding the conditions for UV irradiation, it is preferred that conditions be selected within the aforementioned range of the cure rate that can maintain stickiness (tackiness) of a surface of the pre-cured resin layer 5 during the bonding operation in the step (C) described later. If expressed in terms of a measured numerical value obtained by a probe tack method (RHESCA method: a method of placing a sample with an adhesive side thereof facing up, pressing a probe against the adhesive side from above, and peeling the probe) using a tacking tester (TAC-1000, available from RHESCA CO., LTD.), such conditions capable of maintaining stickiness are 30 $N/cm^2$ or more. (See "Method of measuring physical properties of adhesive material" in http://www.rhesca.co.jp/main/technical/technical.html.)

Step (C) (Bonding Step)

Figure 1E:
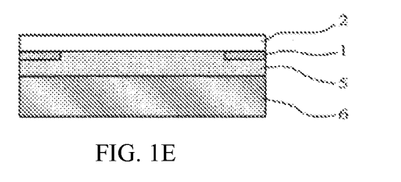

Next, as shown in PRIOR ART FIG. 1E, the light-transmitting cover member 2 is bonded to the image display member 6 from a side thereof on which the pre-cured resin layer 5 is formed. This bonding can be performed by applying pressure at from 10° C. to 80° C. by using a publicly known pressure bonding device.

Step (D) Complete Curing Step)

Figure 1F:
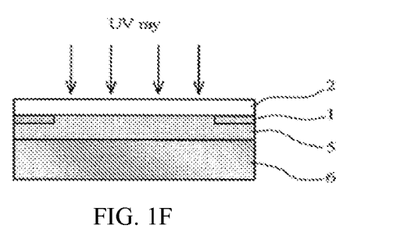
Figure 1G:
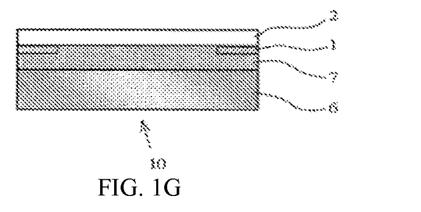

Next, as shown in PRIOR ART FIG. 1F, the pre-cured resin layer 5 held between the image display member 6 and the light-transmitting cover member 2 is irradiated with a UV ray to be completely cured. If necessary, the pre-cured resin layer 5 between the light-shielding layer 1 of the light-transmitting cover member 2 and the image display member 6 may be irradiated with a UV ray to be completely cured. As a result, the image display member 6 and the light-transmitting cover member 2 are stacked via a light-transmitting cured resin layer 7, thereby obtaining an image display device 10 (PRIOR ART FIG. 1G). Some of the limitations of this approach and chemistry are as follow:

- Two UV cure steps are required which is another process step in the manufacturing line.
- More importantly shrinkage still occurs after the display has been laminated inducing strain on the active display.
- Shadowed areas of adhesive, for example under the bezel are not cured to the same extent as the body of the adhesive. This can degrade faster than a fully cured perimeter and allow delamination and moisture ingress.
- Non-bonded tackifier, liquid oils and other non-reactive components makes up a large portion of the adhesive. This has the potential to create leaching, creep and delamination and a limitation to the final bonding strength of the adhesive layer.

Thus, there exists a need for a chemistry and process of use thereof that overcomes the aforementioned limitations of the prior art. There further exists a need for a chemistry and process of use thereof that is amenable as damming materials that are dispensed around the perimeter of an area to be bonded by LOCA and then light cured as a PSA bead of desired height.

SUMMARY OF THE INVENTION

A process for creating an assembly with a pressure sensitive adhesive includes the application of a light curable composition to a first substrate of the assembly. The light curable composition is cured with a single light exposure step to form a fully polymerized pressure sensitive adhesive. The resulting pressure sensitive adhesive is brought into contact with a second substrate with sufficient force to bond the second substrate to the first substrate to complete the assembly with the pressure sensitive adhesive.

A composition is also provided that includes a photo-curable resin composition of a preferred constitution suitable for the aforementioned case contains the following components (I) to (V):

Component (I) an (meth)acrylate-based oligomer component selected from the group consisting of a polyurethane-based (meth)acrylate oligomer;

Component (II) (meth)acrylate monomer components;

Component (III) a photopolymerization initiator component;

Component (IV) additives such as antioxidants, UV and heat stabilizers, adhesion promoters and, components for adjustment of modulus;

Component (V) reactive and inert resins for viscosity modification; the total amount of the components (I) and (II) contained in the photo-curable resin composition is from 25 to 98% by mass; the amount of the component (III) contained in the photo-curable resin composition is from 1 to 10% by mass; the component (IV) contained in the photo-curable resin composition is from 1-30%; the component (V) contained in the photo-curable resin composition is from 0-30%. These constituting components are described in detail below.

Component (I)

The photo-curable resin composition of the present invention contains an acrylic oligomer component (component (I)) as a photoradical polymerization component in order for a cured material to maintain its properties as a film. In the present invention, at least one type selected from the group consisting of a polyurethane-based (meth)acrylate oligomer having a polyurethane skeleton in a main chain, is applicable as the aforementioned acrylic oligomer component.

The polyurethane-based (meth)acrylate oligomer can be one having a molecular weight of preferably from 1,000 to 100,000 as determined by GPC measurement. Specific and preferred examples thereof can include those formed from polyether or polyester polyols and aliphatic isocyanates such as isophorone diisocyanate, hydrogenated diphenylmethylene diisocyanate, hexamethylene diisocyanate and methacrylated hydroxyl ethyl isocyanate.

Component (II)

The photo-curable resin composition of the present invention contains a photoradical polymerizable acrylic monomer component (component II) functioning as a reactive diluent. Specific and preferred examples of the acrylic monomer component can include isobornyl(meth)acrylate, long chain alkyl(meth)acrylates, alkoxylated (meth)acrylates, ethoxyethoxy ethyl acrylate and tetrahydrofurfural (meth)acrylates.

Component (III)

The photo-curable resin composition of the present invention contains a photopolymerization initiator component (component (III)) for photoradically polymerizing photopolymerizable components such as the components (I) and (II). Suitable examples include 1-hydroxy-cyclohexylphenyl ketone (IRGACURE 184, available from BASF Chemicals Inc.), (IRGACURE 754, available from BASF Chemicals Inc.), trimethylbenzoyldiphenylphosphine oxide, alpha-hydroxyketones, benzophenone, and acetophenone.

Component (IV)

The photo-curable resin composition of the present invention contains additives (component (IV)) such as antioxidant Irgacure MD1024 from BASF Corporation, UV and heat stabilizers such as Tinuvin 144 from BASF Corporation, reactive adhesion promoters such as methacryloxypropyl trimethoxysilane, acrylic acid and reactive components for adjustment of modulus such as thiols as known in the industry, higher Tg inert resins such as soluble acrylics and polyesters such as Elvacite resins available from Lucite Corporation USA and monofunctional oligomers such as Rahn 4188 from Rahn USA Corporation and BR3741AJ from Bomar Corporation USA.

Component (V)

The photo-curable resin composition of the present invention may also contain additives (component (V)) to modify viscosity which may be reactive such as the Jaylink acrylamide cellulose esters from Bomar Corporation USA or inert such as the CAB (cellulose acetate butyrate) resins from Eastman Chemical Corporation USA.

Notable in the description of the present inventive composition the of a requirement for tackifies resins or plasticizing oils to create a UV curable PSA.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings wherein like reference numerals refer to like parts throughout the several views, and in which:

DETAILED DESCRIPTION OF THE PREFERRED EMBODIMENTS

A re-workable elastomeric fast-curing with light doses ranging from 500 mJ/cm2 to 8,000 mJ/cm2 adhesive is provided with ability to cure in thin bond-lines and thick bond-lines having thicknesses ranging from 25 micron-300 micron. The present invention has applications in a variety of settings where it is desirous to have structural performance with rework or repair ability and thus not structurally permanent illustratively includes electronics such as touch panels, LCD/OLED and other display technologies for cell phones, tablets, laptops, desktops and televisions.

This application describes an inventive processes referred to herein as Pressure Sensitive Adhesive Optically Clear Adhesive (PSA OCA) Assembly.

Embodiments of the PSA OCA process first applies a liquid adhesive to either side of the assembly and then exposes it to UV and/or visible light. This causes the formation of a fully cured PSA film on the device or on the back side of the cover glass. The lamination of the two pieces takes place with immediate fixture because of the PSA nature of the cured adhesive.

Should rework be required the thin wire method may be used. In an alternative, advantageous method, the assembly can be heated to a moderate temperature, of approximately—80-100° C. At these temperatures the peel strength of the PSA is greatly reduced and the assembly can easily be peeled apart, thereby facilitating the re-working of the pressure sensitive adhesive after the completion of an assembly. Thus, a re-working of an assembly may be by heating the pressure sensitive adhesive to a temperature of between 80 and 100 degrees Celsius and removing a first substrate or a second substrate from the assembly, as will be shown in the examples and figures below.

Embodiments of the inventive light curable composition that forms a pressure sensitive adhesive upon cure may include: a flexible oligomer of at least one of: an aliphatic urethane acrylate having a number molecular weight of between 100 and 100,000, and combinations thereof; a monofunctional oligomer of at least one of a monofunctional urethane acrylate, having a number molecular weight of between 100 and 50,000, and combinations thereof; a diluting monomer; and a photoinitator to cure the monofunctional oligomer and the diluting monomer in the presence of light. In specific embodiments the flexible oligomer may be present from 5 to 18 total weight percent, and the monofunctional oligomer may be present from 5 to 18 total weight percent, and the diluting monomer may be present from 5 to 18 total weight percent. The light curable composition that forms a pressure sensitive adhesive upon cure may further have a modified saturated polyester resin and an inert resin, where the inert resin may have a modified saturated polyester resin present from 5 to 38 total weight percent. In a specific embodiment the photoinitiator is at least one of trimethylbenzoyldiphenylphosphine oxide, alpha-hydroxyketones, a benzophenone, and combinations thereof.

The advantages of the PSA OCA Assembly process are as follows.

Only one light exposure is required, reducing process step(s).

The light exposure completely cures all areas of the adhesive prior to assembly;

This significantly reduces strain on the final assembly because all of the shrinkage occurs before lamination.

There are no shadowed areas. Adhesive under the bezel will be as resistant to leaching and delamination as the bulk of the bonded area.

In a preferred method of the invention the UV PSA adhesive used does not have extractable tackifiers or plasticizers. That is, a plurality of all components of the formulation polymerize into the final adhesive matrix.

Figure 2A:
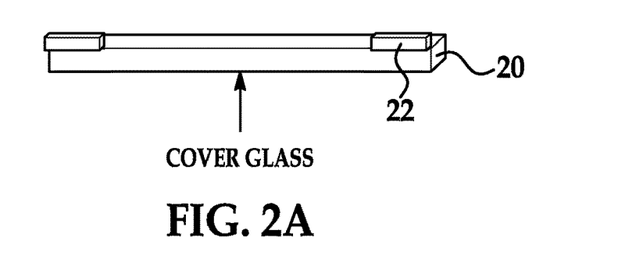
FIGS. 2A-E are schematic steps of an inventive process with an inventive light curable composition applied to a transparent first substrate, illustratively including an electronic device cover glass.
Figure 2B:
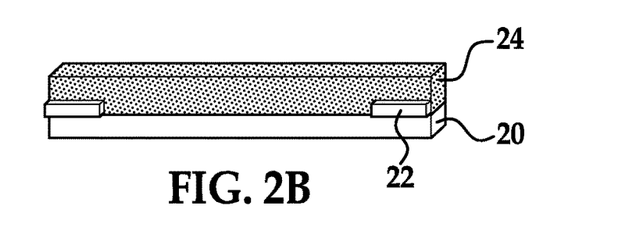
Figure 2C:
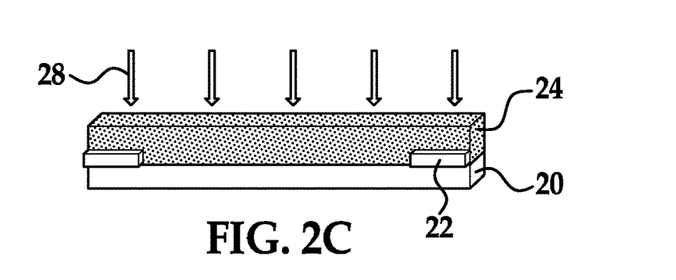
Figure 2D:
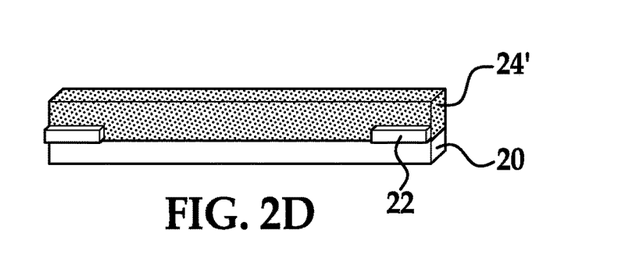
Figure 2E:
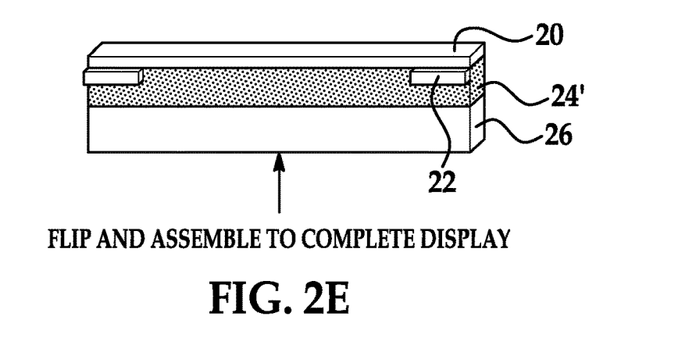

Referring now to the figures, FIGS. 2A-2E and 3A-3E illustrate the application of the UV PSA adhesive to two different sides of an assembly. FIGS. 2A-E are schematic steps of an inventive process with an inventive light curable composition 24 illustratively including Liquid Optically Clear Adhesives (LOCA) applied to a transparent first substrate, illustratively including an electronic device cover glass 20 and over a light blocking bezel 22 as shown in FIG. 2B, where the light blocking bezel 22 is applied along the perimeter of the cover glass 20 (FIG. 2A). In FIG. 2C the light curable composition 24 is cured in a single light exposure step to form the pressure sensitive adhesive 24' (FIG. 2D), where the light exposure is illustrated as arrows 28. The curing light may be ultraviolet or visible light. The fully cured pressure sensitive adhesive 24' is contacted to a second substrate 26 in FIG. 2E with sufficient force to bond the second substrate 26 to the first substrate 20 to complete the assembly with the pressure sensitive adhesive 24'. In a specific embodiment the second substrate 26 may be a display base, and the partial assembly of FIG. 2D may be flipped when joined to the second substrate.

Figure 3A:
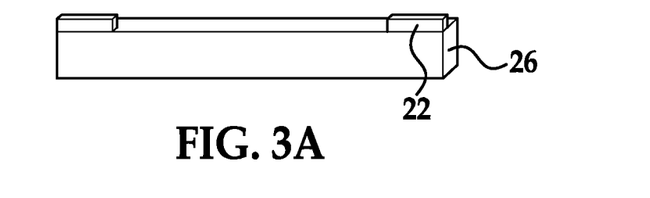
FIGS. 3A-E are schematic steps of an inventive process with an inventive light curable composition applied to an opaque first substrate, illustratively including an electronic device electronic assembly.
Figure 3B:
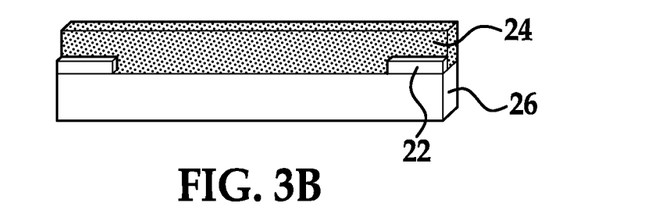
Figure 3C:
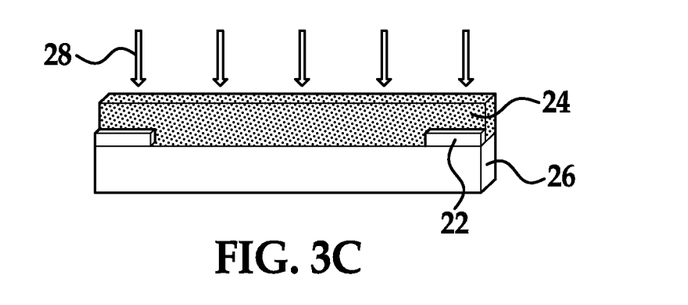
Figure 3D:
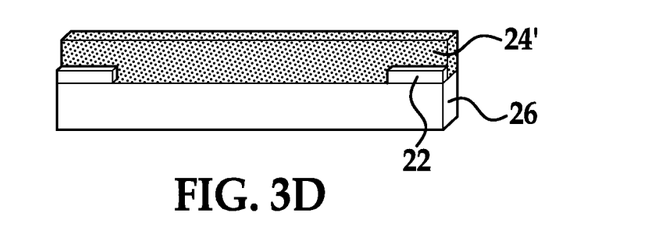
Figure 3E:
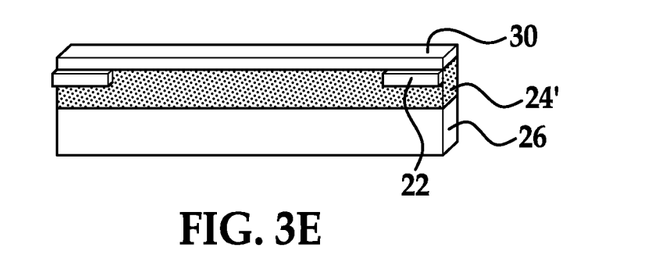

In the embodiment shown in FIGS. 3A-3E the first substrate is the display base 26 with the light blocking bezel 22 applied along the perimeter of the display base 26 as shown in FIG. 3A. In FIG. 3B the inventive light curable composition 24 illustratively including Liquid Optically Clear Adhesives (LOCA) is applied to the display base 26. It is noted that in a specific embodiment the first substrate may be an electronics assembly of an electronic device. In FIG. 3C the light curable composition 24 is cured in a single light exposure step to form the pressure sensitive adhesive 24' (FIG. 3D), where the light exposure is illustrated as arrows 28. The curing light may be ultraviolet or visible light. In FIG. 3E a laminate layer 30 is applied to the pressure sensitive adhesive 24'.

In specific embodiments the light curable composition may be degassed prior to the curing step. In specific embodiments the light curable composition may be shrunk during the curing step and prior to the contacting step. It is noted that the first substrate and the second substrate define an electronic device, the electronic device being at least one of a smart phone, a computer display, a television display, or a tablet device.

Figure 4A:
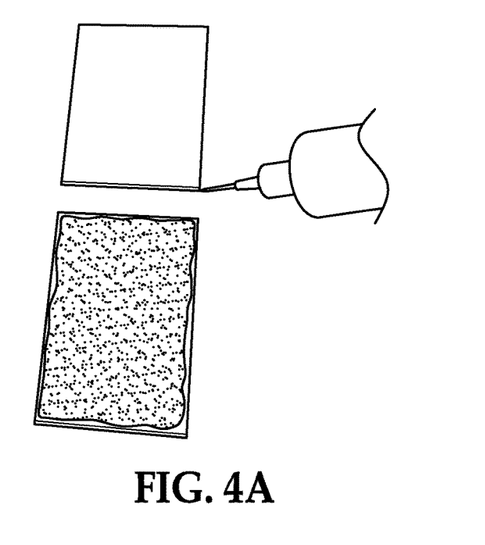
FIGS. 4A-F are a series of photos of an inventive process with an inventive light curable composition applied as a dam, and for illustrative purposes only is shown with a transparent first substrate.
Figure 4B:
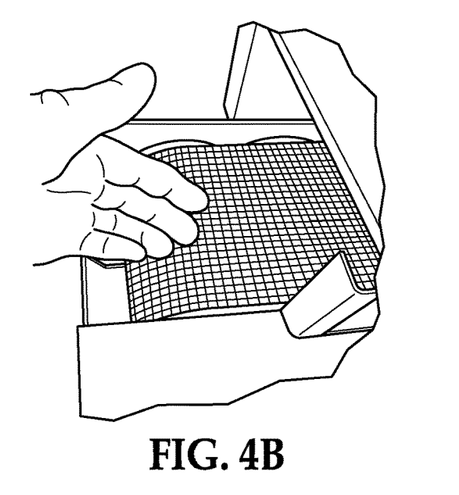
Figure 4C:
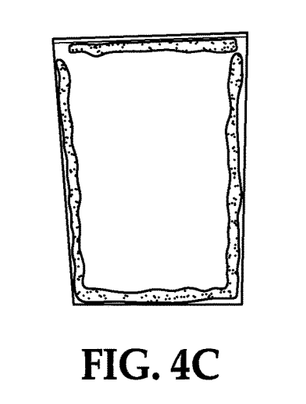
Figure 4D:
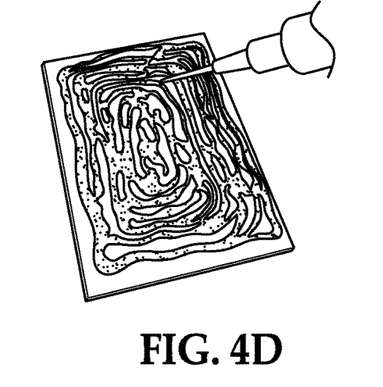
Figure 4E:
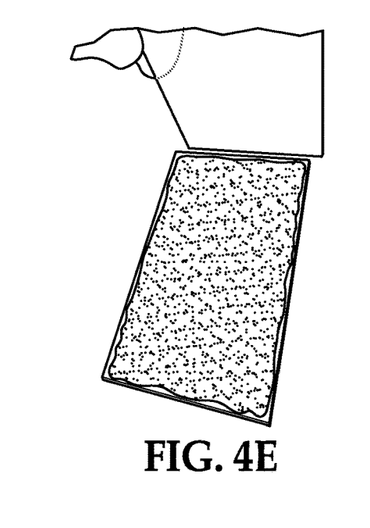
Figure 4F:
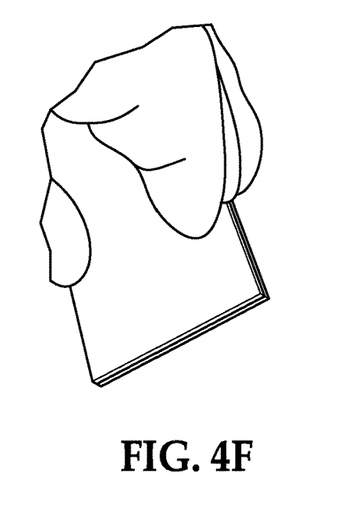
Figure 5A:
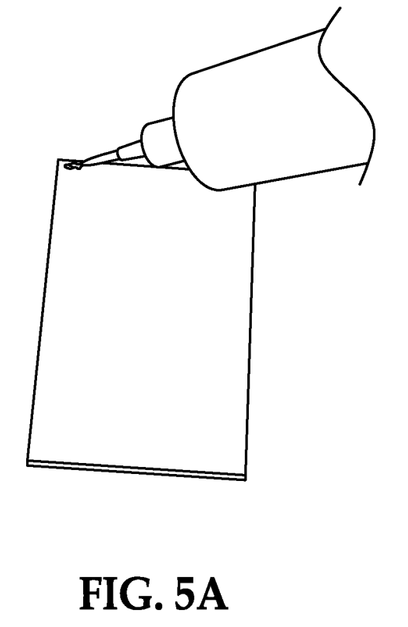
FIGS. 5A-D are a series of photos of an inventive process with an inventive light curable composition applied as a dam and including the formation of an opaque bezel, and for illustrative purposes only is shown with a transparent first substrate.
Figure 5B:
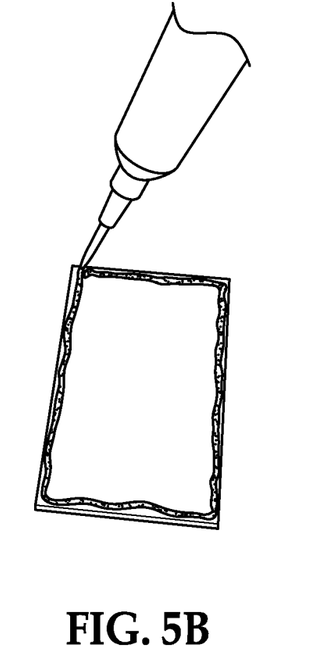
Figure 5C:
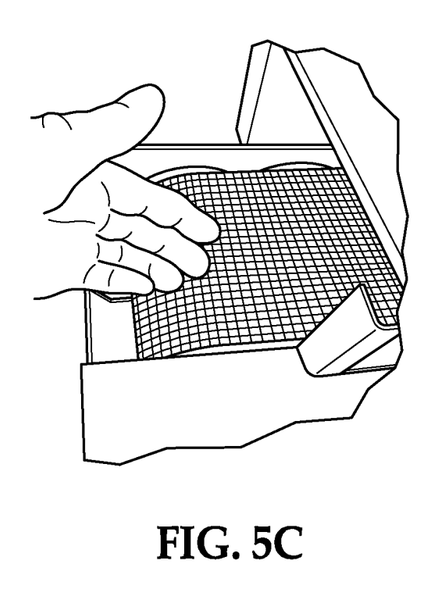
Figure 5D:
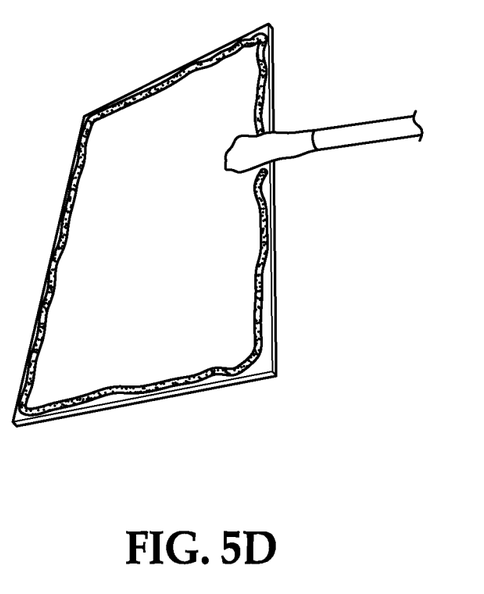

A further inventive use of UV PSA materials are as damming materials as shown in FIGS. 4A-4F for a transparent first substrate and in FIGS. 5A-5D that includes the formation of an opaque bezel with a transparent first substrate. As shown in FIG. 4A and FIGS. 5A and 5B a liquid material may be dispensed around the perimeter of an area to be bonded by LOCA and then cured by light (FIGS. 4B and 5C) to a PSA bead of desired height as shown in FIG. 4C. The interior of this dammed area may be filled with liquid adhesive as shown in FIG. 4D and a cover glass laid down such that the PSA bead immediately bonds and seals the area as shown in FIGS. 4E and 4F, which forces entrapped air out ahead of the laminated glass. Once assembled the PSA perimeter acts as a fixturing mechanism so that the piece can be safely handled, examined and moved through the light exposure that cures the interior LOCA. This process may be used to replace time consuming taping methods currently in use.

An advantageous variant is to use a UV PSA that has been pigmented to an opaque color, illustratively including black or white as best shown in FIG. 5B, and use that as both a dam and as a replacement for the light blocking bezel currently printed at the edge of all displays.

Figure 6A:
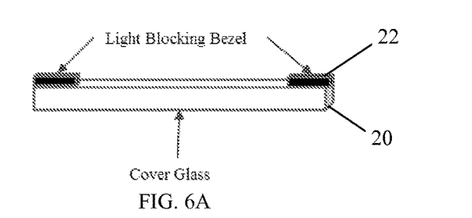
FIGS. 6A-6F are schematic steps of an inventive process for stageable UV-PSA for device assembly.
Figure 6B:
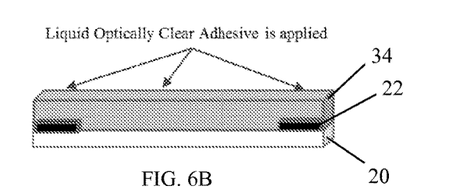
Figure 6C:
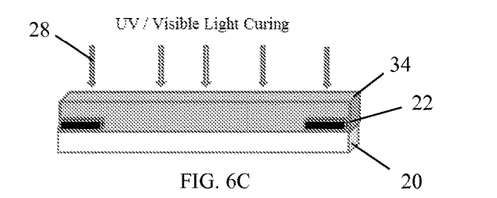
Figure 6D:
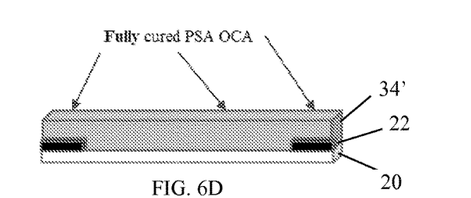
Figures 6E, 6F:
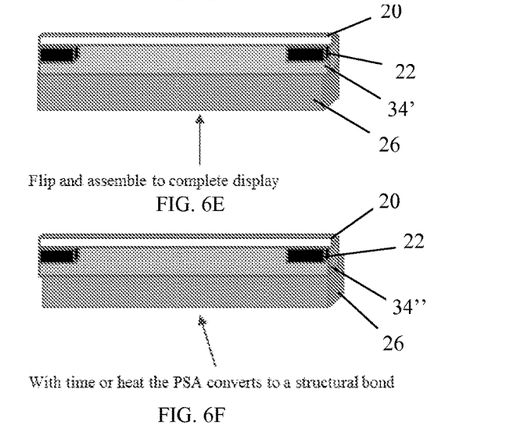

Another advantageous use of UV PSA materials in device assembly is by the preparation of "Stageable UV PSA" 34 products as shown in FIGS. 6A-6F. The UV cure creates a PSA matrix 34' that also has material triggered by a secondary cure mechanism illustratively including time or heat that, after a delay, polymerizes to a co-polymer or interpenetrating network (IPN) 34" as shown in FIG. 6F. The immediate preparation of a PSA material conveys the above described advantages for a period of time and then the bond "stages" or cures further to a permanent, more structural adhesive. The LOCA adhesive in this way would become a structural component of the fully assembled device.

The advantages of a permanent bond also would be for devices operating at higher temperatures, more extreme environmental conditions and more physically demanding situations.

The time delay to the staging reaction can be varied as can the method of the secondary cure. For example both cures can be initiated by the light exposure with the staging reaction lagging behind the PSA formation. This reaction system is described herein.

Also other staging reactions activated by heat, moisture, two component catalyst activation, and the like are possible. Non-limiting illustrative chemistries for staging may include epoxies, urethanes, silicones, N-methylols and other materials known in the art.

Technical Description

Table 1 is a listing of ingredients by weight and function of an embodiment of the inventive UV PSA.

TABLE 1

Ingredient list for a UV PSA #1 for specific embodiment and range of ingredient values provided as parentheticals.
UV PSA #1.

| Ingredient | % by Weight | Proposed Function |
|---|---|---|
| aliphatic urethane acrylate | 7 (5-50%) | Flexible oligomer |
| monofunctional urethane acrylate oligomer | 8 (0-15%) | Mono-functional oligomer |
| modified saturated polyester resin | 27 (0-30%) | Resin to adjust modulus |
| urethane acrylate monomer | 27 (5-50%) | Light curable monomer |
| inert resin | 9 (0-25%) | Resin to adjust viscosity |
| ethoxyethoxy ethylacrylate | 15 (0-25%) | Flexible monomer |
| mixture of trimethylbenzoyldiphenylphosphine oxide, alpha-hydroxyketones and benzophenone derivatives | 6 (1-10%) | Photoinitiator blend |

EXAMPLES

These examples demonstrate the processes to be claimed in this patent filing. It should be remarked that other additions and modifications as known in the art are also expected to be covered. Several in particular are light and heat stabilizers to maintain clarity of the cured adhesives, adhesion promoters, flow control additives, pigments and dyes and various blends of photoinitiators.

Example 1

The formulation of Table 1 was coated onto clear Mylar film with a draw down bar at a nominal thickness of 3-mil. The coated Mylar film was exposed for 45 seconds to a doped Mercury bulb flood lamp at an intensity of 20 mW/cm2 measured with a 365 nm radiometer. The resultant total dose was measured to be 900 mJ/cm2.

The full cure dose can be calculated by integrating an FT-IR absorption peak area (X) at from 790 to 830 cm$^{-1}$ above a baseline of an FT-IR measurement chart about a resin composition layer before UV irradiation and an absorption peak area (Y) at from 790 to 830 cm$^{-1}$ above a baseline of an FT-IR measurement chart about the resin composition layer after a range of UV doses. The 100% cure dose is when the resultant plot of peak area versus mJ/cm2 has substantially stopped changing, that is the tangent point of the curve as it levels off The resultant film was clear and tacky without significant removal from the Mylar when pressed with a finger, which is a good initial determinant of a PSA product. The PSA film was laminated to a 1-inch wide steel lap with a roller and approximately one pound of pressure. The next day the peel strength was measured at 4 pounds per lineal inch (pli).

The coated Mylar material was used to simulate an actual cell phone display assembly process using 2 inch by 3 inch glass slides as seen in the photo stream of FIGS. 4A-4F.

Example 2

To simulate the processes as described for FIG. 2 and in FIG. 3, a 3-mil nominal coating of liquid PSA #1 was applied to a glass slide using a draw down bar. The liquid was exposed to a dose of 900 mJ/cm2 and then carefully laminated to another glass slide. An immediate fixture of the two slides was achieved. After 2 hours the slides could not be separated without breakage of the glass. However when heated to 100° C. the pieces could be peeled apart thereby providing for re-workability of assemblies.

Example 3

The damming process was demonstrated as in the photo stream of FIGS. 4A-4F using PSA #1 and a conventional LOCA material, CTECH 20-187-3A. A bead was drawn using the PSA, exposed to 900 mJ/cm2 which creates a PSA dam with two exit holes at one end. The liquid 20-187-3A was used to fill the interior and then the matching slide slowly lowered driving the liquid in front towards the exit holes. The entrapped air escaped and a clear bond line resulted. This was exposed to 1500 mJ/cm2 creating the resultant final assembly.

A further variant as shown in FIGS. 5A-5D was created by adding black pigment to PSA #1. When used as a PSA dam it created an opaque bead after UV exposure that retained its PSA properties.

Table 2 is a listing of ingredients by weight and function of an embodiment of the inventive stageable UV PSA.

TABLE 2

Ingredient list for a stageable UV PSA #2.
Stageable UV PSA #2.

| Ingredient | % by Weight | Proposed Function |
|---|---|---|
| UV PSA#1 | 64.6 (25-90%) | UV PSA |
| UCB UVA1500 | 22.0 (5-40%) | Cycloaliphatic di-epoxide |
| 4-Hydroxybutyl acrylate | 8.6 (0-20%) | Crosslinking additive |
| iodonium, (4-methylphenyl)[4-(2-methylpropyl)phenyl]-, hexafluorophosphate(1-) | 4.3 (0.5-7%) | Photoacid generator |
| isopropylthioxanthone | 0.5 (0-5%) | Visible light sensitizer |

Example 4

A sample of Formulation #2 as listed in Table 2 was coated on to Mylar and cured with 1000 mJ/cm2 exposure. The resultant solid film was a tacky PSA product that accepted a steel lap readily and immediately held the assembly when lifted vertically. This shows that the PSA property of the original formulation was maintained even with the introduction of a significant amount of material that had not immediately reacted.

By the next day after ambient storage the open film was tack free and firm and the bond line when peeled apart was also tack free and the adhesive remained on the steel surface. That is, it had transferred from the original surface to the new steel substrate.

Both of these observations prove that the light initiated epoxy reaction was delayed and cured or "staged" at a later time to a non-PSA, permanent adhesive.

This material would suitably demonstrate the process as shown in FIG. 6.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A process for creating an assembly with a pressure sensitive adhesive and reworking the created assembly, the creating process comprising:
    applying a liquid light curable composition with a viscosity from 0.01 to 100 Pa·s as measured at 25° C. to a first substrate of the assembly;
    curing the light curable composition in only a single light exposure step to form the pressure sensitive adhesive; and
    contacting the pressure sensitive adhesive to a second substrate with sufficient force to bond the second substrate to the first substrate to complete the assembly with the pressure sensitive adhesive; and
    the reworking process comprising:
    heating the assembly to a temperature of 80 to 100° C. to re-work the pressure sensitive adhesive after the completion of the assembly to reduce the peel strength of the pressure sensitive adhesive; and
    peeling the pressure sensitive adhesive from one of the first substrate or the second substrate while at the temperature.

2. The process of claim 1 further comprising degassing the light curable composition prior to said curing step.

3. The process of claim 1 wherein said curing step is complete as to light curable monomer.

4. The process of claim 1 further comprising shrinking the light curable composition during said curing step and prior to said contacting step.

5. The process of claim 1 further comprising the light curable composition being applied to the first substrate and a light blocking bezel in contact with the first substrate.

6. The process of claim 1 wherein the first substrate is a cover glass of an electronic device.

7. The process of claim 1 wherein the first substrate is an electronics assembly of an electronic device.

8. The process of claim 1 wherein the first substrate and the second substrate define an electronic device, the electronic device being at least one of a smart phone, a computer display, a television display, or a tablet device.

9. The process of claim 1 wherein the light curable composition in said applying step defines a dam.

* * * * *